(12) United States Patent
Shrivastava

(10) Patent No.: US 8,442,847 B1
(45) Date of Patent: *May 14, 2013

(54) METHOD OF MAKING INSURANCE COMPARISONS BETWEEN DIFFERENT INSURANCE PLANS

(71) Applicant: Maxn Systems, Inc., Sunnyvale, CA (US)

(72) Inventor: Rajeev Shrivastava, Santa Clara, CA (US)

(73) Assignee: Maxn Systems, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,972

(22) Filed: Nov. 2, 2012

Related U.S. Application Data

(63) Continuation-in-part of application No. 12/767,042, filed on Apr. 26, 2010, now Pat. No. 8,306,832.

(60) Provisional application No. 61/226,962, filed on Jul. 20, 2009.

(51) Int. Cl.
*G06Q 40/00* (2012.01)

(52) U.S. Cl.
USPC .................................................. 705/4; 705/35

(58) Field of Classification Search ................ 705/4, 35
See application file for complete search history.

(56) References Cited

U.S. PATENT DOCUMENTS

| | | | |
|---|---|---|---|
| 7,426,474 B2 * | 9/2008 | Schoenbaum et al. | 705/2 |
| 7,966,200 B1 * | 6/2011 | Hopkins | 705/4 |
| 7,966,201 B1 * | 6/2011 | Hopkins | 705/4 |
| 7,966,202 B1 * | 6/2011 | Hopkins | 705/4 |
| 7,974,859 B1 * | 7/2011 | Hopkins | 705/4 |
| 8,073,714 B1 * | 12/2011 | Ball | 705/4 |
| 8,306,832 B2 * | 11/2012 | Shrivastava et al. | 705/4 |
| 2002/0055862 A1 | 5/2002 | Jinks | |
| 2002/0116228 A1 * | 8/2002 | Bauer et al. | 705/4 |
| 2002/0147617 A1 * | 10/2002 | Schoenbaum et al. | 705/4 |
| 2004/0024619 A1 * | 2/2004 | DiBella | 705/4 |
| 2005/0108064 A1 * | 5/2005 | Castleman et al. | 705/4 |
| 2006/0248008 A1 | 11/2006 | Lind | |
| 2008/0109378 A1 * | 5/2008 | Papadimitriou | 705/36 R |
| 2009/0094068 A1 * | 4/2009 | Wright et al. | 705/4 |
| 2009/0276247 A1 | 11/2009 | Howell | |

* cited by examiner

*Primary Examiner* — Narayanswamy Subramanian

(74) *Attorney, Agent, or Firm* — Stephen E. Zweig

(57) ABSTRACT

A computerized method of allowing insurance customers to make better informed insurance purchases. The invention allows customers, who may be unfamiliar with the chances that various types of losses will occur and/or the true costs associated with these losses, to enter in various insurance loss scenarios and scenario parameters into a computer database which also contains information on various insurance plans. The invention outputs comparative information as to how adequately the various insurance plans perform according to the various customer selected scenarios, and comparative plan costs. The method can be implemented using computerized servers and client devices communicating using standard internet protocols over the internet. The invention may be used for any type of insurance product, and is particularly well suited for situations where consumers may have an unusually low amount of information regarding risks and associated costs, such as online purchase of various foreign coverage medical insurance plans.

19 Claims, 9 Drawing Sheets

Figure 5

Visitor Insurance > Quotes & Compare Best Visitor Insurance USA Plans

Visitor Insurance Quote and Compare

Provide the following information about the Visitors to get Best Quotes

| | |
|---|---|
| Nationality | Non US Citizen ▾ |
| Coverage Area | USA Only ▾ |
| Applicant Age | 50-59 ▾   Years Or  Enter as Date of Birth |
| Does Spouse Need Coverage? | ○ Yes  ○ No |
| Do Dependent Children Need Coverage? | ○ Yes  ○ No |
| Coverage Period | Start Date  Apr ▾  19 ▾  2010 ▾  📅 |
| | End Date  May ▾  18 ▾  2010 ▾  📅 |

Get Quotes

Figure 6

STEP 1
SELECT MEDICAL SITUATIONS

STEP 2
ESTIMATE MEDICAL COSTS

STEP 3
COMPARE POLICY BENEFITS

600

Step 1: Select Medical Situations

Select one or more medical situations that you might run into, from the following:
We will use this information to estimate and compare different visitor insurance policies for you.

Please select at least one medical situation!

Simple Medical Situation
(less expensive, e.g. flu etc.)                           Help

- ☑ Doctor's visit / consultation
- ☑ Lab Tests / X-ray
- ☑ Prescription drugs

602

Complex Medical Situation
(more expensive, e.g. accident, surgery)                  Help

- ☑ Hospital Room
- ☑ Surgery
- ☑ Intensive Care
- ☑ Ambulance

604

Please select visitor's age!

What is the visitor's age? * [30-39 ▾]

606

Note: For age 80 and above, many coverage restrictions apply. Please call 1-866-384-9104 to talk to a licensed insurance agent.

[Next ▶]

Figure 7

| Services Used | Frequency/Cost | Average Cost* | Estimated Hospital Bill |
|---|---|---|---|
| Doctor's visit / consultation | 2 visits | $75 per visit | $150 |
| Lab Tests / X-ray | 3 tests | $100 per test | $300 |
| Prescription drugs | $100 | $100 | $100 |
| Hospital Room | 2 days | $3,000 per day | $6,000 |

Step 2: Estimate Medical Costs

Edit Medical Situations ▼

Following is an estimate of your medical cost based on the selections you made above. You can adjust the and number of times you expect to use each service, and get a revised estimate. See an example

METHOD OF MAKING INSURANCE COMPARISONS BETWEEN DIFFERENT INSURANCE PLANS

CROSS REFERENCE TO RELATED APPLICATIONS

This application is a continuation in part of U.S. patent application Ser. No. 12/767,042, "Insurance Benefits Estimator", Inventors Rajeev Shrivastava and Amit Goel, Apr. 26, 2010; application Ser. No. 12/767,042 in turn claimed the priority benefit of provisional application No. 61/226,962 "Insurance Benefits Estimator—this tool enables a consumer to create hypothetical medical situations and simulate the "out of pocket" expenses incurred by the consumers for each situation if different insurance policies were to be purchased", filed on Jul. 20, 2009, Rajeev Shrivastava Inventor.

BACKGROUND OF THE INVENTION

1. Field of the Invention

The invention is in the field of computerized networked insurance methods, with a specific emphasis on methods to allow average insurance purchasers to rapidly and easily model various insurance loss scenarios, evaluate how various insurance plans operate under such scenarios, and make better informed purchase decisions.

2. Description of the Related Art

Insurance policies usually provide various types of coverage benefits (e.g. vehicle insurance, home insurance, business insurance, life insurance, property insurance, and various types of health insurance such as hospitalization benefits, ambulance benefits, emergency care benefits and the like). Although prior art computerized systems exist whereby a consumer (user) may use a web browser to access a server and purchase insurance, these prior art systems do not provide enough comparative information and ability to construct alternative scenarios to enable a consumer or user to make a fully informed purchasing decision.

Thus at present, a consumer might purchase an insurance policy with a low premium without clearly understanding the various types of coverage benefits provided by the insurance policy, possible inadequate coverage under some scenarios, and the costs the consumer might incur when it is time to file a claim.

As a result, the consumer might end up paying a higher cost at the time of filing a claim. Alternatively, the consumer may purchase more insurance than is likely to be needed under most realistic scenarios, and end up spending too much in insurance premiums as a result. Both outcomes are unsatisfactory.

These problems are particularly acute when the consumer wishes to purchase insurance, such as vehicle, business, life, property or health insurance, in a country other than that of the consumer's country of origin (usually the country of the consumer's citizenship). This is because consumers accustomed to the price structures in their country of origin may be quite unfamiliar with the very differing price structures in other countries, and thus may either under purchase insurance (e.g. not purchase sufficient insurance) or alternatively waste money by purchasing much more coverage than is actually needed.

Here, unfortunately, the fact that average consumers were often ignorant of the true probability of various adverse scenarios, and the costs incurred by these various adverse scenarios, tended to benefit insurance companies. That is, given that the insurance companies themselves used sophisticated actuarial techniques to keep on top of these issues, the fact that their customers were ignorant may have tended to benefit the insurance companies, thus providing little incentive to correct this problem.

In any event, prior art in this area was generally entirely one country based, and there was little emphasis on helping average customers (as opposed to insurance actuaries) make better informed purchasing decisions. Prior art in this area includes Howell, US patent publication 2009/0276247 entitled "Systems and methods for web-based group insurance/benefits procurement and/or administration". Other prior art with this type of single country focus includes Jinks, US patent publication 2002/0055862, entitled "Systems and methods for interactively evaluating a commercial insurance risk"; and Lind, US patent publication 2006/0248008, entitled "Method of evaluating a benefit plan".

BRIEF SUMMARY OF THE INVENTION

The invention is based, in part, on the insight that at present, there is an inherent information asymmetry between insurance actuaries, who can draw upon statistics from a broad range of historical loss scenarios to help formulate insurance plans, and average insurance purchasers (customers, users). In contrast to actuaries, most insurance purchasers, at least consumer level insurance purchasers, have only a vague understanding of the probability that certain adverse scenarios will occur, as well as only a vague understanding of the costs or losses that will result from these various adverse scenarios. This information asymmetry makes the insurance purchasing process inefficient. As previously discussed, this inefficiency can result in either the consumer paying too much and becoming over insured, or alternatively failing to obtain necessary insurance (possibly due to the high costs of over insurance), and absorbing losses that might have otherwise been avoided if the consumer was better informed. Thus methods to reduce this information asymmetry, and in particular to put more information regarding probability of various adverse scenarios occurring and the true costs of these various adverse scenarios would be beneficial. Indeed such methods would likely be highly prized by insurance purchasers, and thus insurance companies that offered such methods might have a competitive advantage.

To graphically illustrate this type of information asymmetry problem, consider the situation where the insurance consumer is operating with an unusually low amount of information. This frequently occurs, for example, in travel scenarios, where the consumer may be traveling to one or more foreign countries with very different currencies and underlying price structures. This also frequently occurs in scenarios where individuals are purchasing health/medical insurance, because even within one's native country, the probability of various medical risks and associated costs are relatively unknown to the average consumer. Thus the various forms of travel health/medical insurance represent situations where the insurance consumer may have almost no information regarding probability of adverse events and associated costs, as a result, many of the examples in this disclosure will focus on various types of travel medical/health insurance.

However, if consumers were armed with more information pertaining to probability of adverse scenarios and true associated costs, average consumers would be able to more efficiently choose insurance plans more appropriate to their particular budget and needs, and avoid losses due to under insurance or over insurance.

Here, unfortunately, there are also problems of information overload to consider. The average insurance purchaser will typically wish to make an informed purchase in a short period time, such as a few minutes to an hour, and thus is in no position to digest large amounts of statistical data. Here alternative methods to educate the insurance consumer, such as allowing the consumer to play with various online scenarios and quickly understand the consequences, can be very effective.

The invention is thus based, in part, on the insight that consumers would be expected to highly value an ability to understand if the insurance plan that they are contemplating purchasing is able to cope with a variety of foreseeable and often customer selected/tested scenarios.

This invention is also based, in part, on a generalization of an earlier insight, previously discussed in parent application Ser. Nos. 12/767,042 and 61/226,962, the contents of which are incorporated herein by reference, that travelers or other persons migrating to other countries (i.e. that are foreign to them) have a particularly acute need for more information while making insurance purchases. This additional information can be provided by giving the consumer an easy ability to construct alternative risk and cost scenarios. This type of alternate scenario capability allows individuals who are otherwise generally be unaccustomed to the relative expenses to that particular foreign country to at least partially overcome this comparative information disadvantage.

Thus to summarize, the insurance purchaser information disadvantage, which exists for all types of insurance, is particularly acute when the consumer is purchasing medical/health insurance in countries other than the consumer's home country (usually country of citizenship) because consumers are usually unaware of both medical costs in general, probability of such medical costs, and how such medical costs can widely differ on a country-by-country basis. Thus by focusing on the problems of foreign medical insurance, some important principles can be determined that can then be applied to the online evaluation and purchase of almost any type of insurance.

The present invention thus embodies a computerized networked system and method that, for example, enables a consumer to create various hypothetical adverse scenario situations and simulate the "out-of-pocket" or other type expenses incurred by the consumer for each situation if different insurance policies were to be purchased. In one embodiment, the invention may be a method of operating a database of insurance information that may reside on a server, and may be accessed by various customers over a network such as the internet, using various types of clients and client devices such as web browsers and other internet enabled apps running on smart phones, tablet computers handheld devices, laptop computers, desktop computers, and the like. In another embodiment, the invention is a method of making comparisons between different insurance plans over a network, which may be the internet, or may be an alternative type of network such as the phone system, or a private network.

The invention assists typical consumers in the decision-making process while the consumer is shopping for insurance. It does so by letting the consumer, before purchasing insurance, first specify certain adverse scenarios and desired coverage benefits. The invention then evaluates the ability of a plurality of insurance policies to handle these various consumer selected scenarios and coverage benefits, and reports to the consumer a list of possible insurance policies that may (or may not) meet the various adverse scenarios and coverage benefits desired by the consumer. The invention can also allow the consumer to evaluate the adequacy of the various insurance plans by reporting, for example, the various "out-of-pocket" expenses or other expenses that the consumer would expect to incur with each policy.

As previously discussed, although the invention's methods may be used for essentially any type of insurance plans, because the information asymmetry problem is particularly severe for foreign medical insurance, the invention's methods are thus particularly advantageous for foreign medical insurance. This can include travel health insurance, international health insurance, and other types of health insurance. Thus foreign medical insurance applications will be emphasized in this disclosure.

Focusing, for the moment, on these foreign medical insurance applications, here for example an individual may wish to travel to a foreign country or otherwise reside for a period of time in a country other than his country of origin. However because medical expenses can vary greatly from country to country, and an individual wishing to purchase travel medical/health insurance or international medical/health insurance for a travel or other stay to a foreign country, regardless of travel duration, will be at a high information disadvantage because he or she will be uninformed as to the true cost of various types of medical coverage in the foreign country. Thus in order to make informed decisions, this individual should ideally make medical insurance purchases that are not based upon simple benefit amounts, but rather are based on at least an appreciation of what the particular benefit amounts actually mean in terms of covering various medical expenses under various adverse medical scenarios in the foreign country, and ideally also including some sort of information on the relative probability of these adverse scenarios occurring as well.

Thus in one embodiment, the invention is a method of making comparisons between different varieties of different insurance plans over a network, such as different medical insurance plans. Here, for example, these different medical insurance plans could be different travel or foreign stay medical insurance plans of various durations (e.g. short term, medium term, long term duration).

The invention will be typically implemented in the form of software that controls the operation of servers and one or more databases. To implement the invention, one or more database administrators will usually set up a database comprising various types of information pertaining to the various insurance plans of interest.

For example, again returning to medical insurance applications, the database administrator(s) will typically enter information on the cost parameters and reimbursement parameters associated with a variety of different medical insurance plans into a computer database. The system administrator(s) will also often set up one or more user input forms, which will often be in the form of at least one web page or script. (Here a script can cover multiple web pages, and indeed the input/output scheme may be implemented by a single script in some embodiments.)

This one or more web pages or script may be sent from a network server to the user, often over a network such as the internet, and often in the form of at least one web page or app screen that will be displayed on a client device (client) (e.g. a computer, computerized cell phone, etc.) that is usually local to the client.

Note, however, that in an alternative embodiment, if the system is designed to, for example, operate over the telephone, the user input form could be presented as a series of audio cues such as "press 7 if you want to request additional coverage for your spouse", and the system could alternatively respond to vocal commands or telephone keypad presses. As yet another embodiment, the user may interact with a mobile app, such as a smartphone app or tablet app, which has been customized to work with smaller size touch sensitive display screens. For simplicity however, most of the examples in this specification will be examples where the form or forms are one or more web pages that are being read on a web browser (or app) on the user's client device, and where the user in turn is entering data into the various web pages (or apps) in the form of mouse clicks, keyboard entries, or touches on a touch sensitive display screen.

The user input form will ideally be capable of capturing a variety of different user risk parameters, as well as a variety of different user risk scenarios. The data from this form will then be transmitted from the client (e.g. client device such as a web browser or other network connected app) to the originating server or alternative destination as appropriate. Once this data is received, various algorithms, which will be described in more detail in the following sections, will analyze the user data from the form using the database of various types of insurance plan information. Often the results of this computerized analysis will then be used to produce a ranked comparison of the benefits. Additionally, often the invention will provide the costs of the plans as well. Often this analysis will also have further breakdowns of results as a function of the various user risk parameters and user scenario parameters. Typically the results of this analysis will be formatted by this system into one or more appropriate web pages (or app screens), and then sent to the user's client system where the results may then be viewed and analyzed by the user. Alternatively the results may be conveyed back to a mobile app, or even relayed back by audio information over an audio connection.

BRIEF DESCRIPTION OF THE DRAWINGS

FIG. 5 shows an example of a user input form, here running in the web browser of a client, which for a health/medical travel or foreign stay insurance application can capture both some risk parameters such as the user travel parameters and some of the user's medical parameters.

FIG. 6 shows an example of a user input form, again for a health/medical oriented travel or foreign stay insurance purposes again here running on the web browser of a client, which can start to capture some of the various medical scenario parameters.

FIG. 7 shows an example of a user input form, again here running on the web browser of a client, which can capture additional information on the factors such as various medical parameters.

DETAILED DESCRIPTION OF THE INVENTION

Figure 1:
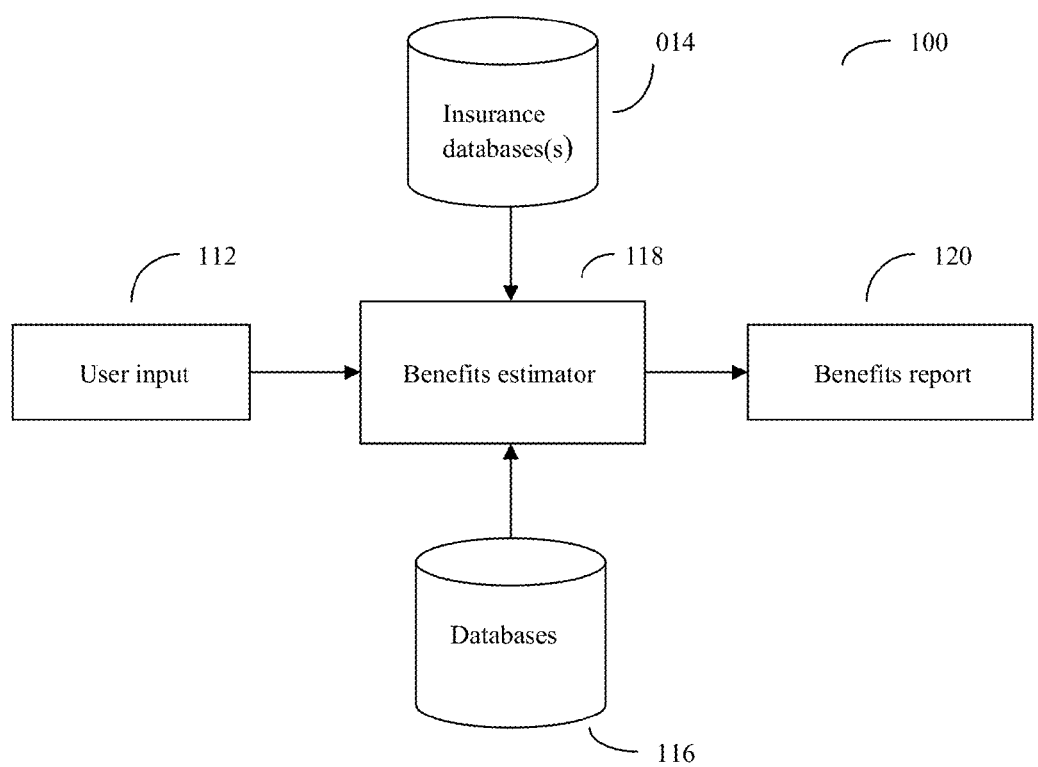
FIG. 1 shows an overview showing how the user input data may be combined with insurance database data to produce a benefits report.

As previously discussed, the present invention embodies a system and method that enables a consumer to create hypothetical insurance loss situations and simulate the "out-of-pocket" expenses incurred by the consumer for each situation if different insurance policies were to be purchased. As previously described, the invention will typically be implemented in the form of software that resides on a network server and database. This specification may be viewed as a functional description of the various software modules that implement the invention.

In one embodiment, the invention may be a method of making insurance comparisons between various different insurance plans, over a network. This method will generally use an insurance database produced by entering information on a plurality of premium parameters and reimbursement parameters of a plurality of different insurance plans into a computer database. Typically these premium parameters will vary as a function of one or more risk parameters. The method will generally also require a user cost computer database produced by entering information on the projected user costs associated with various scenarios of possible alternative future events into a computer database. This database will often be part of, or at least connected to, a network server such as an internet server.

Generally, the computer system that implements the invention will construct at least one user input form capable of capturing a plurality of risk parameters and scenario parameters, and will then transmit this the user input form (or information needed to produce this user input form) to at least one client device. This client device will often be a computerized device such as a Smartphone, tablet computer, laptop computer, desktop computer, and the like, typically operated either by, or for, a user desiring to purchase insurance. In a preferred embodiment, this client device will be connected by a network, such as the internet, to the invention's internet server.

The invention will use this at least one user input form, running on the client device, to capture this plurality of risk parameters and scenario parameters. Additionally the system will allow the user to enter or select various scenario parameters which allow the user to select at least one possible alternative future event into the input form. Put alternatively, the system invites the user to model various alternative future events where insurance coverage might be needed, and assess the adequacy of the various insurance products in financially handing these various alternative future events.

The system will then usually transmit this plurality of risk parameters and scenario parameters to the invention's server, although in some embodiments, the risk parameters and scenario parameters may alternatively be evaluated locally on the client device.

The invention will usually use at least one algorithm, along with the risk parameters, and retrieve the various premium parameters and reimbursement parameters from a plurality of different insurance plans in the computer database. The net effect will be to produce a comparison result generally showing premiums (e.g. costs of) as well as the reimbursement benefits provided by these various different insurance plans.

The invention will generally then transmit these comparison results to the client device, and display these comparison results along with additional data. This additional data can include data pertaining to:

1: The projected user costs according to the various user entered scenario parameters.

2: Also according to the various user entered scenarios, information pertaining to the differences between the insurance reimbursement parameters, and the projected user costs—e.g. data showing the gap between insurance coverage and projected damages.

The net effect is that the system thus allows the user to enter in various parameters that describe alternative insurable scenarios. The system, in turn, will provide the user with a) information pertaining to both the premiums of the various insurance plans; and b) information pertaining how adequately the insurance plan(s) in question reimburses the user for the projected costs, based on these various user entered scenarios.

In some embodiments, the invention will use one or more user input forms that will also be capable of capturing various insurance coverage time parameters (e.g. time coverage desired to start, time coverage desired to start, or time coverage desired to start, and duration time, and or options to renew). Here the user (using the client device) can use these one or more forms to input the data (or the form can capture) these insurance coverage time parameters, and when this data has been entered, the client device can then transmit these insurance coverage time parameters to the invention's server. The invention will then typically use these user entered insurance coverage time parameters in its algorithm(s) to, for example determine how much the various insurance plans cost (e.g. their premium payments).

The invention may use various ways to output information pertaining to the differences between the reimbursement parameters the projected user costs. Often this information will be output on the display screen of a client computerized device. This information may be output or expressed as, for example as numeric value(s), various symbol(s) or various graphic image(s) (e.g. thumbs up, smiley faces, and the like). This difference information, which can be either computed locally at the client device, at the server, or by some combination of the two will generally be produced by a mathematical function of the projected reimbursement parameters the projected user costs. In a preferred embodiment, this difference information may be expressed as a user savings value (e.g. the projected user costs of the adverse event, minus projected insurance plan reimbursement or benefits).

According to the invention, the projected user costs may also include various parameters. Generally at least some of these parameters may include parameters such as costs to replace lost user items, costs to repair damaged user items, costs to repair replace items belonging to others, costs to compensate for lost user income, and costs to compensate others for lost income. For medical insurance applications, these parameters may include medical expenses, dental expenses, health related expenses, medical services, and health related services.

Also according to the invention, the users will be able to use the user input form to rearrange the various scenario parameters into alternate orders of events, so that the same scenario parameters may be evaluated according to alternate orders of scenario events. In other words, according to the invention, the user is able (and in fact encouraged to) experiment with various alternative insurable event scenarios, see the results according to various insurance plans, and by this method gain additional information about risks and associated costs that will help the user make better informed insurance purchase decisions.

Typically, to make the results easy for users to evaluate, the user's client device may be programmed or configured to rank or sort the comparison results and/or display (or print out, or give audio output of) this ranked or sorted output. For example, the results may be ranked or sorted according to various criteria such as insurance premium amount, adequacy of reimbursement, location of the organization that offers the insurance plan, or rating of the organization that offers the insurance plan. Alternatively the system may just select the best plan according to the algorithm, and directly recommend this best plan to the user.

EXAMPLES

Since, as previously discussed, this disclosure will use various health/medical travel and foreign stay insurance produces as specific application examples, a few definitions are thus in order.

Nomenclature: In the health insurance industry, health insurance purchasers who intend to travel out of their country of origin (usually their country of citizenship) can purchase insurance according to different types of plans. When the purchaser is contemplating a short duration trip (e.g. days or months), and is less interested in having the option to renew the insurance after that short duration trip, then the travel health insurance product is often sold as "travel health insurance". By contrast, when the purchaser is contemplating a medium duration trip, stay, or other absence from their country of origin of months or years, and/or is interested in the possibility of being able to easily renew their insurance coverage, then the travel health insurance product is often sold under the name "international health insurance". There, instead of specifying a trip start date and end date, as is often the case with short duration travel, the user instead will specify their country of origin (again usually citizenship), the desired coverage start date (often but not always starting from the date of departure from the country of origin), and instead of specifying a firm end date, the user may instead purchase a number of months of coverage. To encourage longer duration purchases, "international health insurance" plans may require that the user purchase a minimum of two months (e.g. first and last month), and even commit to a year's worth of monthly purchases, and may forfeit their last month's payment if the user cancels early.

Nonetheless, there is a considerable amount of overlap between the two types of "non-country of origin" health insurance. In this disclosure, unless otherwise specified, the term "travel health insurance" is intended to cover both short duration (e.g. days to months) "travel health insurance" as well as longer duration (e.g. months or multiple months) "international health insurance" as well.

As previously discussed, travel or foreign medical insurance coverage is an ideal example to use to illustrate the problems of information asymmetry, and in this disclosure, this type of insurance will be used throughout. Note however, that this particular type of insurance is simply used as an example, and is not otherwise intended to be limiting.

In one travel medical insurance embodiment, the invention may be used to assist travelers to foreign countries purchase an appropriate amount of travel medical insurance. The system allows the users to make informed decisions as to how much coverage to purchase by allowing users to enter data pertaining to their respective medical status, and various hypothetical medical need scenarios (either provided by the consumer, or alternatively provided by the invention in the form of various probability data that the consumer can choose to accept, modify, or reject), and make informed judgments as to how much insurance to purchase based upon these various scenarios. The system and method will inform the customers about the tradeoffs between more extensive coverage and insurance premiums.

The invention assists a consumer, while the consumer is shopping for insurance (often over the internet using a web browser, internet enabled tablet or smartphone "app", or other internet connected client software) in the decision-making process. The invention lets the consumer specify certain desired coverage benefits. The invention then evaluates the various coverage benefits offered by a plurality of insurance policies, and reports to the consumer a list of possible insurance policies that meet the coverage benefits desired by the consumer, along with the "out-of-pocket" expenses the consumer can expect to incur with each policy.

Using medical insurance as an example, consider a young and healthy consumer with very limited funds to pay for insurance premiums, who may only be able to afford coverage for minor ailments like flu, skin rashes; or for a limited number of specific (but more serious) medical treatments (e.g. X-rays, ambulance surgery, etc.). However assume that comprehensive medical insurance may otherwise be so expensive as to be unobtainable.

Absent more information, this particular customer might easily make the mistake of choosing an insurance policy that is suited for minor ailments only. However with more information, perhaps this limited funds customer might be able to do better, make informed decisions to obtain coverage for the real life expenses of at least a few of the higher probability and more serious medical expenses, and thus optimize medical insurance coverage given that customer's funding situation.

As the customer's ability to pay for at least limited insurance increases, given adequate information and scenario modeling capability provided by the invention, the customer's ability to further optimize medical insurance coverage will also increase. In the case where the customer has a higher amount of information about local medical expenses, this customer can then choose to enter the estimated costs that the consumer believes or knows are typically required when the consumer visits a hospital. For example, the consumer might specify the amount he or she believes or knows that doctor consultation, lab tests, prescription drugs, etc may cost. In this high knowledge situation, even with low amounts of funds available to purchase insurance, this customer use the invention's methods to better balance risk and ability to pay, and make an informed insurance selection that is optimal, given the constraints.

In other cases, a consumer with still higher ability to pay for insurance premiums may wish to provide for more major problems, such as the costs of pregnancy, emergency dental work, major accidents, major illness (and the drugs associated with these problems) and the like, yet still desire to minimize costs. In this case, the customer may want an insurance policy that is capable of handling at least the majority of these more substantial problems. However this customer will still need assistance in determining, for example, what the statistically likely costs would be to treat these more substantial problems, at least at various probability levels such as the 75%, 90%, 95% levels in a particular foreign country of interest. The invention may be configured to provide this information as well.

The invention may operate by providing suitable web page forms to the customer's web browser or other internet client (e.g. a Smartphone app). This in turn will generally run on the customer's client computer system (client, client device—e.g. personal computer, cell phone, smartphone, computerized pad, PDA, and the like). The forms will usually operate to accept the customer's input, and then return this input data back to the invention's server and database. The server and database will often (but not always, since some of the information and algorithms could alternatively be at least partially downloaded from the server and database to the client device) contain the relevant information and benefit and comparison algorithms (here these algorithms are occasionally referred to in the alternative as a "benefits wizard"). Once the data (input) is returned, the invention will process the input supplied by the consumer, and report to the consumer a list of possible insurance policies that provide benefits based on the coverage selected by the consumer, along with other optional options, such as options to purchase, options for additional information, options to put in a shopping cart, etc.

The list (or report) of possible insurance policies may also display details or links to details on how much each insurance policy will pay, and how much the consumer will have to pay out of pocket. In this way, the consumer will be able to quickly evaluate many insurance policies, will be able to identify which insurance policy satisfies the consumer's needs more closely, and will often also be able to purchase the right insurance directly from this report. Additionally, when the customer later files a claim, the consumer will also be both more informed and confident of the various benefits offered by the insurance policy.

For example, consider the situation of a visitor from India making a trip to the United States for the first time, or otherwise planning on staying in the US for a period of time. Indian medical costs are much lower than US medical costs. As a result, the visitor may have little idea about what various American medical supplies and procedures cost, and thus may be at high risk for purchasing an inappropriate amount (often too small an amount) of travel medical insurance. This visitor may thus be at high risk of insufficient coverage if an accident or medical emergency happens to him or her while visiting the US. The invention will provide the Indian visitor with sufficient information to avoid this problem.

Consider the opposite situation in which a visitor from the US is traveling to India or staying in India for a period of time. Here the US visitor will be unlikely to be familiar with the various Indian travel medical insurance plans, and will also likely be unfamiliar with the costs of medical treatment in India, which are often considerably lower than comparable costs in the US. As a result, the US visitor is at risk of substantially overpaying for a deluxe travel medical insurance plan or international health insurance plan that far exceeds any likely medical contingency while traveling in India, and thus incur unnecessary expenses. The invention will provide the US visitor with sufficient information to avoid this problem as well.

Although the examples of travel or foreign stays to and from India and the US are cited as specific examples in this specification, it should be evident in addition to employing principles that can be use for any insurance coverage, with regards to travel or foreign stays, the same principles apply to travel, stays, or other visits between any two countries, as well as regions within a country. In general, if given sufficient information on various travel medical insurance policies, and optionally information on local charges for various medical services and products, the system can operate on a worldwide basis, and can be a central clearing house for travelers or other visitors between any and all permutations of various countries and country regions.

Thus with regards to the foreign medical insurance example, the invention may store information pertaining to a wide variety of different travel health/medical insurance plans and international health/medical insurance plans from a wide variety of different countries and also regions within a country. On more complex scenarios in which the individual or group of individuals intend to travel to multiple countries, the system may also allow the individuals to enter a similar set of medical scenarios, and then select the various different countries that they intend to visit. The invention may take this information, consult its various databases, and suggest a variety of different travel medical/health insurance plans and international health/medical insurance plans that best fit the individuals or groups particular medical profile and risk scenario for some or all of the various countries that they intend to visit.

As previously discussed, the invention exists in the form of various different software modules, which often may run on different processors on different computer systems, including computer database systems, web server systems, and client computer systems, often connected by a network such as the internet.

More specifically, as previously discussed the invention which will often be implemented in the form of software that controls the operation of servers and one or more databases. To review, the invention typically requires an administrator to set up a database comprising various types of information pertaining to various insurance plans. In this method the administrator of the database will typically enter information on the cost parameters and reimbursement parameters associated with a variety of different insurance plans into a computer database. This database in turn is connected to a computer server, which in turn is connected to a network, which may be the internet, or alternative form of network. This server may be referred to in the alternative and more general form as a "networked server". The administrator may then set up a user input form, which may be in the form of one or more web pages or app pages or scripts that are sent from a network server to the user, often over a network such as the internet, and often in the form of various web pages that will be displayed on a client (e.g. a computer, computerized cell phone, etc.) device that is usually local to the human client (consumer).

The user input form will ideally be capable of capturing a variety of different user insurance risk parameters, as well as a variety of different user insurable scenarios. The data from this form will then be transmitted back from the client device to the originating server or alternative destination as appropriate. Once this data is received, various algorithms (the "benefits wizard" or "benefits estimator", which will be described in more detail in the following sections), will analyze the user data from the form versus the database of various types of insurance plan information.

Often the results of this computerized analysis will produce a ranked comparison of the benefits, and often the costs as well, provided by the various insurance plans. Again referring to the medical example, often this analysis will also have further breakdowns of results as a function of the various user medical parameters and user scenario parameters. Typically the results of this analysis will be formatted by this system into one or more appropriate web pages, and then sent to the user's client system where the results may then be viewed and analyzed by the user.

As previously discussed, often the invention can be used to compare a variety of different insurance plans from country to country. Although throughout this disclosure, the example of travel medical insurance plans and international health/medical insurance plans have been used as one type of example and embodiment of the invention, again these examples and embodiments are not intended to be limiting. For example, the same principles may be used for automobile insurance or any other activity where insurance is desired, the user may not be fully informed about the financial risk of various scenarios, and the user needs an automated expert system to help construct various scenarios in order to make informed decisions about how much coverage to purchase.

Again, with respect to the medical and travel examples, the term "travel health insurance" or "travel medical insurance" generally encompasses both short duration travel (usually international travel) as well as and longer duration international travel (e.g. international health insurance). Nonetheless, and as previously discussed, for simplicity, the travel medical insurance plan or international health insurance plan (for either short duration excursions or longer duration excursions from the client's country of origin) serves as a good illustration of these general principles, and will continue to be used here as a specific embodiment of the invention.

In order to capture information useful to compare travel medical insurance plans from country to country, often the user input form, provided by the server to the user's client computer, will be capable of capturing a variety of different user travel parameters, including the user's itinerary—country of origin, intermediate countries or regions of countries visited, country of destination, or region of travel, length of travel (or alternatively time of travel start or time that coverage is desired, and either a travel end date, or alternatively a purchase of X days, months, or years of coverage from the start date). The various benefits estimator or benefits wizard algorithms may then take this type of data into account when analyzing the various insurance plans.

The user may input parameters responsive to the user's individual risk factors as well. In the case of automobile travel insurance, this could be information pertaining to the user's model of auto, mileage, repair record, which would allow an automobile insurance system to assess the underlying risk of breakdowns. In the case of medical insurance, this information will cover the user's various medical parameters. These medical parameters can include the user's (traveler's) age, sex, and pre-existing medical conditions. Other useful information to collect will include data on the user's spouse who may be traveling with the user, along with information on the spouse's age, sex, and pre-existing medical conditions. Still other useful information will include data on the user's children or dependent children, their ages, sexes, pre-existing conditions and the like.

The various scenario parameters that the user may enter into the form include the user's own estimate of the probabilities of various mishaps or disasters occurring during the insured period, such as while traveling. Alternatively the server may supply actual or recommended statistics on these probabilities. In the case of automobile insurance, this would be scenarios such as automobile breakdown or low speed minor accidents and hotel time while the automobile was repaired. Alternatively the user may wish to insure for more disastrous situations, such as major collisions, fatal collisions, and so on.

In the case of medical insurance, and in particular the various types of travel or foreign stay medical insurance, the corresponding scenario parameters that the user may enter into the form may include parameters such as simple medical situations—e.g. doctor's visits, doctor's consultations, common laboratory tests, standard x-rays, and various common prescription drugs. The user may also wish to consider more complex medical situations, such as hospital room costs, various types of surgery, intensive care stays, urgent care services, emergency services (i.e. emergency room costs), therapy, and anesthesia. Other more complex treatments may include dental treatments, eye treatments, and ambulance costs. Costs associated with pre-existing medical conditions may also be entered into the scenario. For example if one member of the party is pregnant, emergency treatment for childbirth or medical complications of pregnancy may also be part of the scenario.

Even within a country, or even within a region of a country, medical costs are not totally uniform for each situation. Thus even if the database uses highly accurate average costs for the various medical situations, this average cost will only be appropriate for at most about 50% of all of the medical situations of this type. In order to accommodate users who may wish to do more extensive worst-case planning, the software may also contain information related to variation or other deviation or spread in the costs for various situations, and provide users with the option to consider more than just the average costs. For example, a user might want to be protected against costs for up to one or two or even three standard deviations above normal medical costs. Thus in some embodiments, an additional option to request analysis of above average medical costs may be provided. Since most users are unlikely to be familiar with statistics and standard deviation calculations, the invention's user interface can allow the user to select above average costs by simpler methods, such as specifying that the user wants coverage of typical average costs, or costs that are encountered 90% of the time or less, and so on.

Alternatively, the server may provide one or more previously assigned scenarios, ideally derived from either actual statistics, or educated medical opinion, as to the total costs (e.g. the sum of various hospital stays, treatments, drugs, and the like) associated with certain medical problems in the country of interest, and allow the user to select among these alternatives as well. In still another embodiment, and as previously discussed, these previously assigned scenarios may be assigned various degrees of statistical variance, so that a user could, for example, choose to purchase protection that covers 50%, 75%, 90%, 95%, 99% and so on of the likely medical costs in various previously assigned medical scenarios. Here graphical slider interfaces, and the like, that would allow the user to dial in the desired coverage and get resulting cost information, may be useful.

In order to set up the insurance database, the operator of the database will often wish to enter into the database as much information on the various insurance plans offered as is available or as is possible. For example, for a database of different travel or foreign stay medical insurance plans, the operator or other database administrator will typically enter in information on the various cost parameters and reimbursement parameters of the various insurance plans. The insurance information can additionally be broken down still further into various country specific regions as appropriate.

The database administrator will may optionally create a database of the various medical scenarios and typical costs (and optionally the spread or variance in these costs as well) for the country or country region, and do so for as many different countries and/or country regions as feasible.

Once the user input data is compared to the database of medical scenarios and the database of various insurance plans, the results can then be comparison ranked and ultimately sent to the user's client device for viewing by the user. These comparison results can be ranked in various ways. For example, the results can be ranked according to what percentages of medical costs are covered. Alternatively the results can be ranked according to the plan that gives the highest benefits first. As yet another example, the results can be ranked according to cost, or according to a custom user-entered option.

As previously discussed, often it will be useful to also enable a user to easily purchase a particular insurance plan, often within the context of the plan result ranking. This can be done by providing a "buy" or "request more information on" or "add to shopping cart" or "bookmark" or "add to favorites" button, link, checkbox, radio box, or other indicator that will let the system know that the user is either interested in purchasing that particular insurance plan, or alternatively wishes to select that option as being of particular interest for further analysis later.

Implementation:

The invention's methods can be implemented by a wide variety of different software types which in turn may run under a wide variety of different operating systems. This software may in turn drive a variety of different database management programs, and serve up forms to the remote client system using a variety of different methods.

Most of the examples discussed in this specification, such as the examples given in FIGS. 5 through 9, were implemented using the PHP hypertext preprocessor, which is a general purpose scripting language often used to produce dynamic web pages. This PHP software in turn ran under an Apache web server, under control of the Linux operating system. The database software used for these examples was the MySQL database. These examples were run on servers and clients that used x86 type processors.

Although PHP, Apache, Linux and MySQL were used for specific examples, note that the invention in fact is applicable to all forms of communication between a consumer and the system using any form, medium, or technology now known or later developed, including but not limited to, telephone, email, website, software application, web service, and instant messaging.

FIG. 1 depicts a system (100) that illustrates a simplified view of some of the high-level interactions among the various components in the present invention. Here a consumer provides input (112) to the benefits wizard (118). In some embodiments, the consumer may be operating on a networked client computer which has previously been loaded with an appropriate form. In other embodiments, the consumer may be operating over a telephone or other telecommunications device. In some but not all embodiments, this benefits wizard may be located on a remote server, and the information from the user (112) to the server holding the benefits wizard (118) may travel over a network such as the internet.

In some embodiments, the system may optionally provide the user with a list of both the probability of various adverse events, along with the costs of various adverse events, to facilitate user selection. The user may then view this optional list, and may use the list to help focus on the higher probability adverse events, as well as to then make informed decisions as to the extent of coverage desired.

The user input may consist of the costs of treatment that the consumer expects (e.g. from the optional list) or is willing to pay (or can afford to pay) for certain medical conditions. The benefits wizard uses information from the insurance databases (114) and typical medical costs database (116) to evaluate the consumer's request and provide a report (120) to the user. This report will often contain a list of suitable insurance policies and their coverage benefits. As previously discussed, the list of insurance policies can be sorted in various ways to make it easier for the consumer to identify desirable insurance policies more quickly. For example, the list could be sorted in increasing order of "out-of-pocket" expenses.

The benefits (118) estimator can perform a variety of different calculations, some of which will be discussed in more detail shortly.

As a simple example, consider an insurance policy that will cover 80% of the first $2500 in medical costs, 90% of medical costs between $2500 and $5000, and 100% of medical costs above $5000. While using the benefits wizard tool, if the consumer expects the total medical cost to be $3000, the system will calculate the results as follows:

$$\text{Insurance will pay } 80\% \text{ of } \$2500 + 90\% \text{ of}(\$3000 - \$2500)$$
$$= \$2000 + \$450$$
$$= \$2450$$
$$\text{Out-of-pocket expenses} = \$3000 - \$2450$$
$$= \$550$$

These results can then be presented to the user and/or used to for rank comparisons of the various insurance plans.

Figure 2:
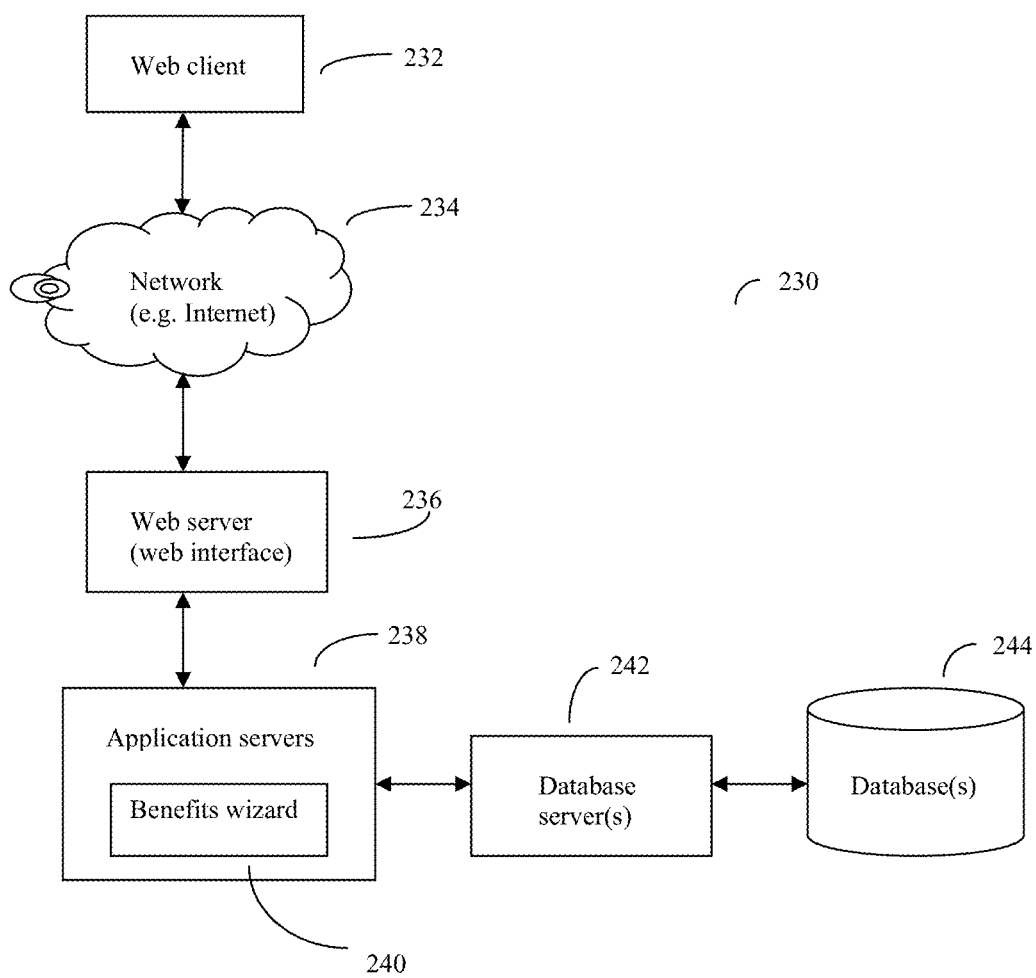
FIG. 2 shows an overview of the data flow between the application servers, the database servers, and the web client.

FIG. 2 illustrates a specific scenario where the benefit wizard tool is used on a system (230) with a client-server architecture where a web client (232) (e.g. a web browser such as the Internet Explorer, a web enabled "app", or other internet connected client software) communicates with a web server (236) and application servers (238) that host the benefits wizard application (240). The application servers are coupled to one or more database servers (242) that facilitate access to one or more databases (244). The benefits wizard provides its service to multiple clients via a network (234) (e.g. the Internet). Note that here, the web server (236) will usually send the form to the user's client or web client (232), and will also receive data from the user that is transmitted back across the internet (234) from the web client (232).

Figure 3:
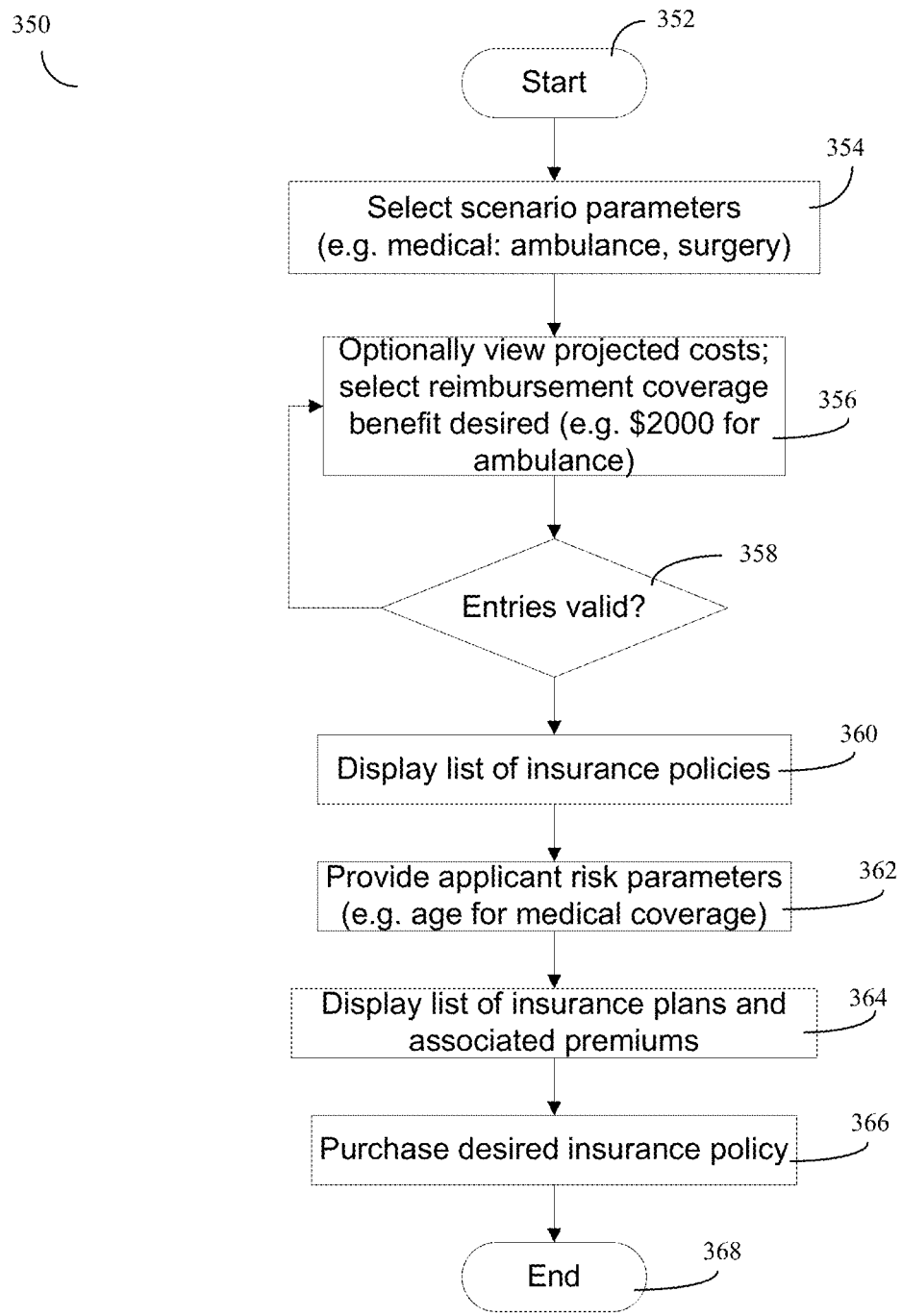
FIG. 3 shows a sequence of steps that may be performed by the user (customer) on the user's client device (client) as the user enters information into the user input form.

FIG. 3 shows a flowchart (350) that illustrates a sequence of steps that may, in some embodiments, be performed by a consumer as the consumer interacts with the benefits wizard application to find a suitable insurance policy. At block (354), the consumer may select what sort of adverse event scenarios he desires coverage for. This can include even specific medical services (e.g. ambulance, surgery) that the consumer thinks he/she might need, and for which the consumer desires coverage. At block (356), the consumer, who may be aided by the projected costs for that type of adverse event that may be provided by the system, may then select the costs the consumer expects or is willing to pay for the services selected at block (354). In alternative embodiments, at block (356), the system itself may automatically provide or at least pre-populate the form with the typical or more worst-case results for the countries or regions where the customer intends to travel or reside. That is, to aid the consumer in selecting appropriate costs for the services, the consumer is presented with a range of costs associated with each service. The consumer should be aware (or the system can inform the user) that the costs of these services could be affected by geographical factors (e.g. cost of ambulance will vary based on the city in which the consumer resides), the choice of hospital, etc. In a preferred embodiment, the system will have a database of these typical costs, as well as the spread in these costs for the particular geographic area in question, and will supply these results to the user automatically.

At block (358), the system validates the consumer's entries, e.g. if the consumer entered $10 coverage for ambulance service, the system reports an error because no insurance policy will provide $10 coverage for ambulance. Alternatively, the system can simply present average or worst case medical costs for this service, and not allow the user to enter in a value below this amount.

After successfully validating the consumer's entries, at block (360), the system will generate a list of insurance policies that provide the coverage desired by the consumer. The list will display, for each insurance policy, the charges that the insurance policy will pay, along with the "out-of-pocket" expenses that the consumer will have to pay. This list may be sorted in order of increasing "out-of-pocket" expenses so the consumer can quickly identify the policies that will provide the maximum benefit. The system can also optionally generate appropriate links to "buy now", "request more information", "bookmark", "add to favorites", or "add to shopping cart" options during this step.

At block (362), the applicant can enter his or her risk parameters (medical parameters) information (such as the applicant's age, sex, etc). (Note that in some embodiments, block (362) may be positioned before block (360), so that no list of policies is provided until the user enters in his or her risk parameters, such as medical parameters). The applicant will then be able to see the list of insurance premiums for each insurance policy (block 364). At block (366), the consumer can then proceed to purchase the policy by clicking on a "Buy Now" or equivalent button, or request more information, or bookmark the policy, or add the policy to list of favorites, or place the policy in a shopping cart for later purchase.

Some more examples of the various algorithms that may be used by the insurance benefits estimator (benefits wizard) are shown below:

Consider an insurance customer with a limited insurance budget who must make some difficult decisions regarding which specific medical services that the customer can afford insurance reimbursement for. In this scenario, the customer may have looked at an optional list of higher probability medical scenarios and costs, and wishes to model a medical scenario in which the customer, as an imaginary future patient, might use the following medical services in the order shown:

X-Rays
Hospitalization
Surgery

Assume the cost of the medical services to be as follows:
X-rays: $500
Hospitalization: $7,000
Surgery: $25,000
Total Cost: $32,500

Now consider an insurance plan (insurance plan 1) that provides coverage as follows:
Insurance Plan 1:
80% coverage up to $2,500
90% coverage to $10,000
100% coverage beyond $10,000

Figure 4:
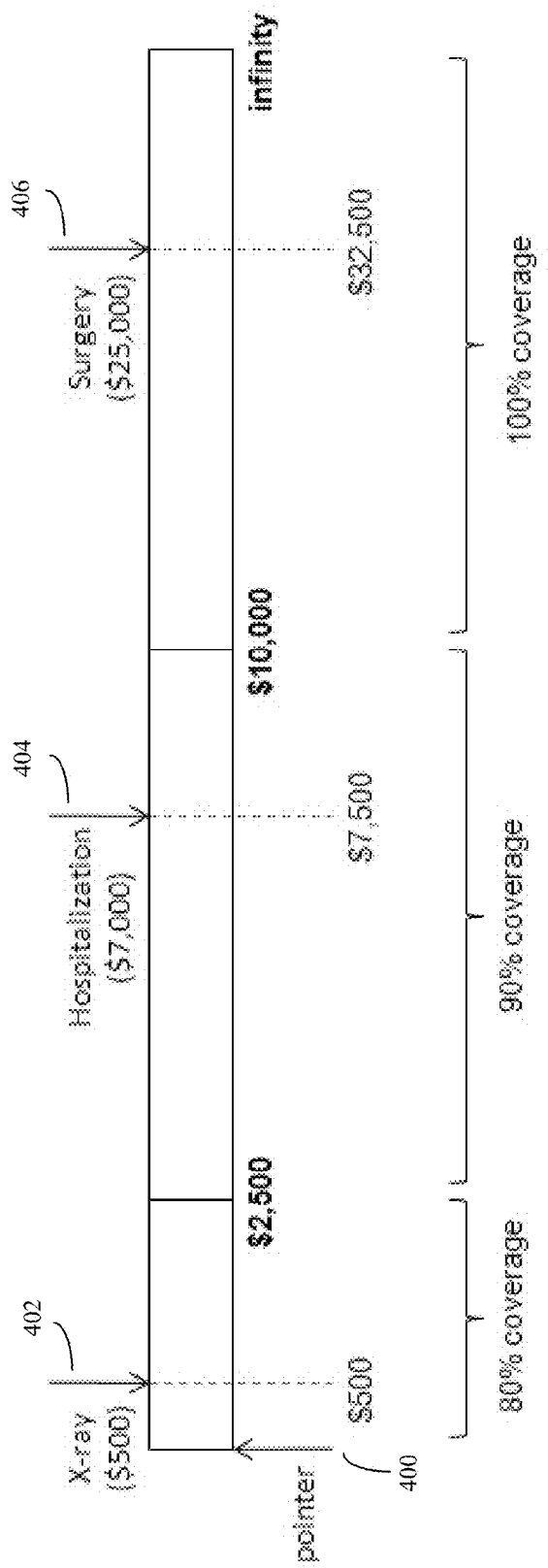
FIG. 4 shows an example of the coverage policies of, for example, a typical travel or foreign stay insurance plan.

This scenario is shown in FIG. 4. To calculate the benefits that the patient will receive, the system software may set a pointer (400) to the beginning of the coverage scale shown above, and begin to move the pointer to the right (402), (404), (406) as it applies the coverage benefits to the medical services used by the patient.

X-Ray (402):
The first $500 will be covered up to 80%, so the insurance will pay 80% of 500=$400.

Hospitalization (404):

The first $2,000 of hospitalization will be covered at 80% and the remaining $7,000−$2,000=$5,000 will be covered at 90%. This means insurance will pay (80% of 2000)+(90% of 5000)=$6,100.

Surgery (406):

The first $2,500 of surgery will be covered at 90% and the remaining $25,000−$2,500=$22,500 will be covered at 100%. This means insurance will pay (90% of 2500)+(100% of 22,500)=$24,750.

This results in the following insurance coverage information and out-of-pocket expenses for this patient are shown in table 1 below:

TABLE 1

| Medical Service | Hospital Bill | Insurance Pays | Patient's Responsibility |
| --- | --- | --- | --- |
| X-ray | $500 | $400 | $100 |
| Hospitalization | $7,000 | $6,100 | $900 |
| Surgery | $25,000 | $24,750 | $250 |
| TOTAL | $32,500 | $31,250 | $1,250 |

Often the user (who will anticipate that he or she may be the patient in question) may be most interested in knowing his or her total out-of-pocket expense ($1250), which is indicated in the lower right hand corner above.

The system may rapidly do this type of analysis over a variety of different insurance plans. For example, consider a situation where the system then compares this scenario with a different insurance plan (insurance plan 2) with different coverage rules, as follows:

Insurance Plan 2:
100% coverage up to $2,500
90% coverage to $10,000
80% coverage beyond $10,000

Assuming the same hospital bill as above:

X-Ray:

The first $500 will be covered up to 100%, so the insurance will pay 100% of 500=$500.

Hospitalization:

The first $2,000 of hospitalization will be covered at 100% and the remaining $7,000−$2,000=$5,000 will be covered at 90%. This means insurance will pay (100% of 2000)+(90% of 5000)=$6,500.

Surgery:

The first $2,500 of surgery will be covered at 90% and the remaining $25,000−$2,500=$22,500 will be covered at 80%. This means insurance will pay (90% of 2500)+(80% of 22,500)=$20,250.

This results in the following insurance coverage information and out-of-pocket expenses for the user (the potential patient), which is shown in table 2 below:

TABLE 2

| Medical Service | Hospital Bill | Insurance Pays | Patient's Responsibility |
| --- | --- | --- | --- |
| X-ray | $500 | $500 | $0 |
| Hospitalization | $7,000 | $6,500 | $500 |
| Surgery | $25,000 | $20,250 | $4,750 |
| TOTAL | $32,500 | $27,250 | $5,250 |

The patient's total out-of-pocket expense in this case will be $5,250, again shown in the lower right hand corner of table 2.

The system will often perform these calculations for all available suitable medical insurance plans, and display the results to the user, often sorted in order, such as most benefits (least patient responsibility) first.

These examples illustrate that depending on the patient's expected medical needs, the patient can determine which insurance plan he would like to purchase with the full knowledge of the out-of-pocket expenses that the patient will incur should he use the medical services while the insurance is active.

In the above case, if the patient expects to use expensive medical services, then the patient is better off purchasing the first insurance policy, because the coverage for the insurance policy increases as the hospital bill increases. However, for simple medical situations that cost only a few hundred or few thousand dollars, often the second insurance plan may be a cheaper option. In some embodiments, the system will display prices as well as benefits, and also include information such as price/benefit or benefit/price ratios to help guide decision making. The system may optionally sort the results in different orders, such as by price/benefit or benefit/price ratios or even some hybrid such as minimum benefit sorting as a primary key and benefit/price as a secondary sorting key, and so on.

Having discussed how the algorithms behind the benefits estimator (benefits wizard) work, let us now turn to a discussion of some example user interfaces for the invention. In this example, these user interfaces will typically be uploaded from a server to a client, such as a personal computer, used by the user. FIGS. 5 through 9 show various screenshots of one embodiment of the invention, here running within a typical web browser screen.

FIG. 5 (500) shows an example of a user input form, typically running in the web browser or other web enabled client software of a client device, which can capture both some of the user travel parameters and medical parameters on the same screen. In other configurations, the user travel parameters and medical parameters may be captured over multiple screens. Indeed in general, just as a paper medical form may consist of many paper pages, any of the client data may be entered on any combination of screens or web pages.

In this example, an individual from outside the US (for example from India) wishes to purchase travel insurance to the US. The applicant can enter in the country where travel medical insurance is desired in box (502), and the applicant's age in (504). This same form can also collect other parameters such as spousal coverage (506), dependent children coverage (508), and coverage period (510).

FIG. 6 shows an example of a user input form, again typically running on the web browser or other app (application software) of a client device, which can start to capture some of the various medical scenario parameters (600). In this example, the user has checked essentially every scenario available for both the simple medical situations (602) and the complex medical situations (604). This form also gives an alternate location in which the user may indicate the age of the applicant (606).

FIG. 7 shows an example of a user input form, again in this example running on the web browser of a client device, which can capture additional information on the various medical scenarios that the applicant (use) wishes to insure against (700). In this example, the system has pre-populated the form (702) with the average medical costs for the particular product or service in the geographical area in which the applicant is traveling (here the US, and the applicant previously told the system that he or she were traveling from outside the US).

The applicant in turn can inform the system about what sort of scenarios the applicant will wish to protect against. For example, here the user has determined that in his or her view, the worst case scenario is two doctors' visits (704), three lab tests (706), one prescription drug (708), and two days stay in a hospital room (710).

Figure 8:
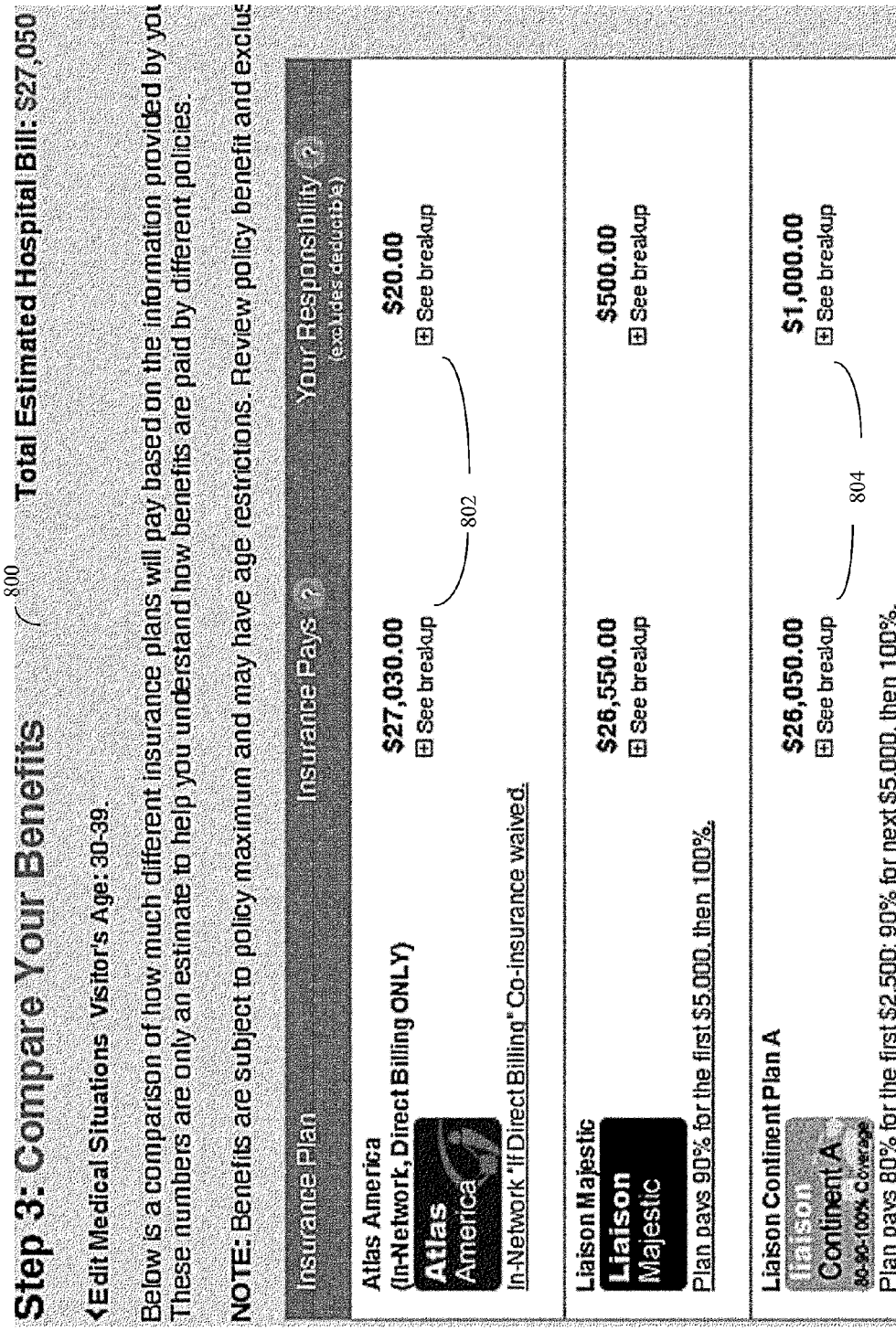
FIG. 8 shows an example of a ranked comparison result of the reimbursement benefits provided by various medical insurance plans, which has been transmitted to the client computer, and is now being viewed by the user in a web browser of a client.

FIG. 8 shows an example of a ranked comparison result of the reimbursement benefits provided by various medical insurance plans which has been transmitted to the client computer and is now being viewed by the user (800). Here the various insurance plans are being ranked in order of best benefits (least user responsibility) first (802) to lesser benefits (more user responsibility) (804) last. The full list may extend far below the small section of the screen that can be shown in this illustration.

In alternative embodiments (not shown) a "buy it" button or "more information" or "add to shopping cart" link can be added to each insurance plan to facilitate user purchase or ability to obtain more information about plans of interest. In other alternative plans, the cost per plan can be displayed in an extra column (not shown). Alternatively the user may choose to sort the plans in alternate order, such as cheapest to most expensive. In still other alternatives, the user can ask the system to calculate what plan(s) deliver the most benefits per unit cost, and sort the plans in a cost effectiveness order, or otherwise highlight those plans that are most cost effective.

Figure 9:
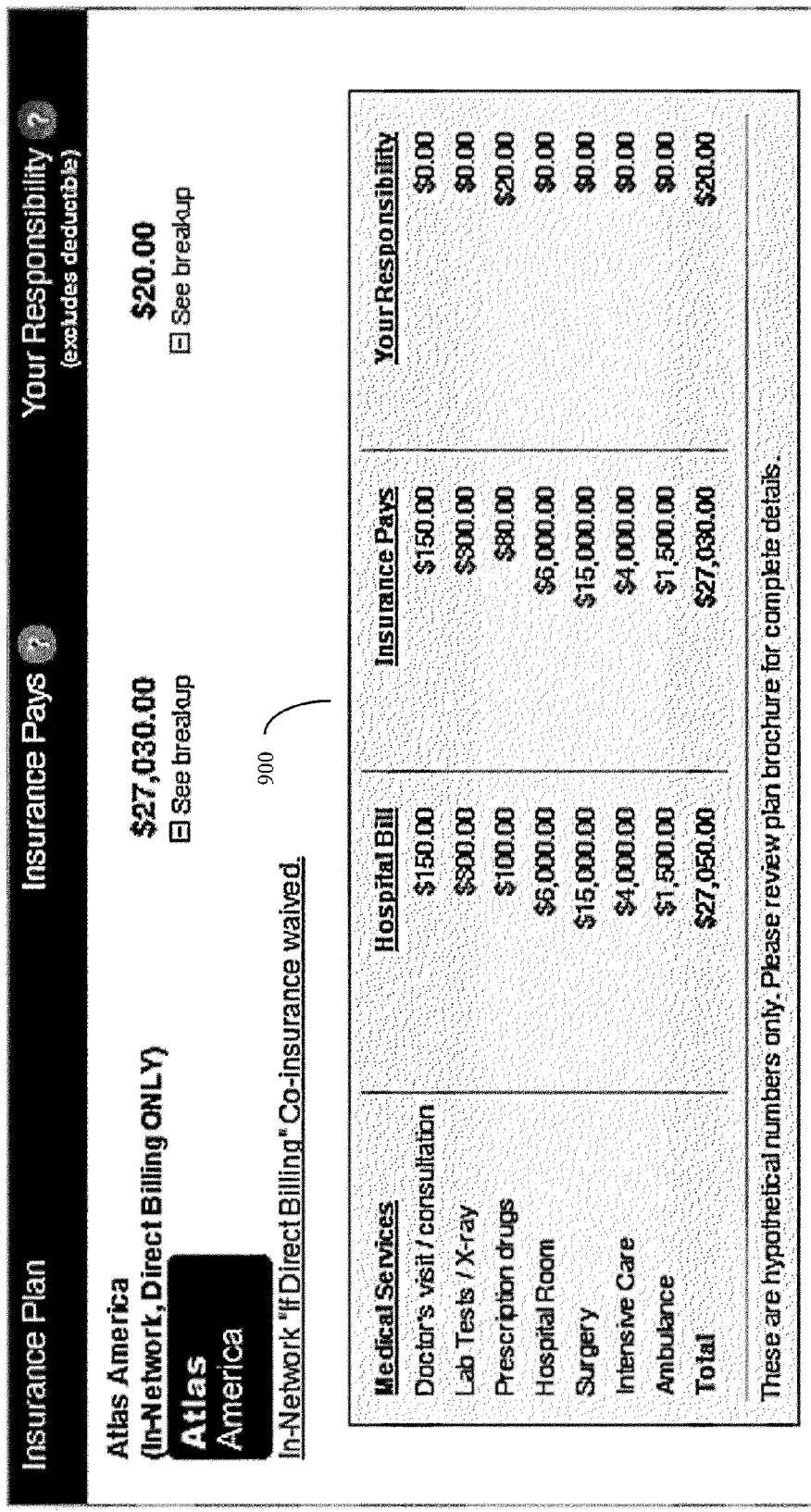
FIG. 9 shows an example of a more detailed breakdown result of the reimbursement benefit provided by a specific medical insurance plan, which has been transmitted to the client computer and is now being viewed by the user in a web browser of a client.

In FIG. 9 a more detailed breakdown result (analysis) of the reimbursement benefit provided by a specific medical insurance plan against a specific user scenario has been transmitted to the client computer and is now being viewed by the user. Here the results from the medical scenario previously entered by the user can be seen at a glance (900).

As previously discussed, although most of the examples in this disclosure have focused on the specific areas of medical insurance, and in particular short or long duration travel or foreign residence medical insurance, the methods discussed herein can, in fact, be applied to many other types of insurance as well. This includes, but is not limited to, auto insurance, travel insurance, health insurance, medical insurance, life insurance, flood insurance, fire insurance, earthquake insurance, renter's insurance, and liability insurance.

The invention claimed is:

1. A method of making insurance comparisons between a plurality of different insurance plans, over a network, said method comprising:
   entering information on a plurality of premium parameters and reimbursement parameters of a plurality of different insurance plans into a computer database;
   wherein said premium parameters vary as a function of one or more risk parameters;
   entering information on the projected user costs associated with various scenarios of possible alternative future events into a computer database;
   constructing at least one user input form capable of capturing a plurality of risk parameters and scenario parameters, and insurance coverage time parameters and transmitting said user input form to at least one client device;
   using said at least one user input form to capture said plurality of risk parameters and scenario parameters, and insurance coverage time parameters on said client device;
   wherein said scenario parameters are selected to allow said user to enter or select at least one possible alternative future event into said input form;
   transmitting said plurality of risk parameters and scenario parameters, and insurance coverage time parameters to a server;
   using at least one algorithm to use said risk parameters and insurance coverage time parameters to retrieve said premium parameters and reimbursement parameters of a plurality of different insurance plans from said computer database, and producing a comparison result of the premiums of, and reimbursement benefits provided by, said plurality of different insurance plans;
   transmitting said comparison results to said at least one client device, and displaying said comparison results along with at least one of:
   a) said projected user costs according to the user entered scenario parameters;
   b) the information pertaining to the differences between said reimbursement parameters and said projected user costs according to the user entered scenario parameters;
   thereby allowing said user to enter in alternative scenario parameters, and receive information pertaining to both the premiums of a plurality of different insurance plans, and the adequacy of said reimbursement of said plurality of different insurance plans according to the projected user costs determined from various user entered scenarios.

2. The method of claim 1, wherein said insurance coverage time parameters comprise an insurance start time and an insurance time duration; an insurance start time and an insurance stop time; and/or an option to renew said insurance coverage.

3. The method of claim 1, wherein the information pertaining to the differences between said reimbursement parameters and said projected user costs is expressed as the value(s), symbol(s) or graphic image(s) produced by a mathematical function of said projected reimbursement parameters and said projected user costs.

4. The method of claim 3, wherein determining said projected user costs and/or determining said mathematical function is either done at said server, or locally at said device.

5. The method of claim 3 wherein the information pertaining to the differences between said reimbursement parameters and said projected user costs is expressed as a user savings value relative to the projected user costs absent reimbursement.

6. The method of claim 1, in which said method uses an internet server and web browser or other internet enabled client software running on a client device (client).

7. The method of claim 1, wherein said projected user costs comprise a plurality of parameters, at least some of said parameters being parameters selected from the group consisting of costs to replace lost user items, costs to repair damaged user items, costs to repair replace items belonging to others, costs to compensate for lost user income, costs to compensate others for lost income, medical expenses, dental expenses, health related expenses, medical services, and health related services.

8. The method of claim 1, in which said scenario parameters may be rearranged by a user using said at least one user input form into alternate orders of events, so that the same scenario parameters may be evaluated according to alternate orders of scenario events.

9. The method of claim 1, wherein said client device displays said comparison results ranked or sorted according to one or more ranking or sorting criteria selected from the group consisting of insurance premium amount, adequacy of said reimbursement, location of the organization that offers said insurance plan, or rating of the organization that offers said insurance plan.

10. A method of making insurance comparisons between a plurality of different insurance plans, over a network, said method comprising:

entering information on a plurality of premium parameters and reimbursement parameters of a plurality of different insurance plans into a computer database;

wherein said premium parameters vary as a function of one or more risk parameters;

entering information on the projected user costs associated with various scenarios of possible alternative future events into a computer database;

constructing at least one user input form capable of capturing a plurality of risk parameters, scenario parameters, and insurance coverage time parameters and transmitting said user input form to at least one client device;

using said at least one user input form to capture said plurality of risk parameters, scenario parameters, and insurance coverage time parameters on said client device;

wherein said scenario parameters are selected to allow said user to enter or select at least one possible alternative future event into said input form;

transmitting said plurality of risk parameters, scenario parameters, and insurance coverage time parameters to a server;

using at least one algorithm to use said risk parameters and insurance coverage time parameters to retrieve said premium parameters and reimbursement parameters of a plurality of different insurance plans from said computer database, and producing a comparison result of the premiums of, and reimbursement benefits provided by, said plurality of different insurance plans;

transmitting said comparison results to said at least one client device, and displaying said comparison results along with at least one of:

a) said projected user costs according to the user entered scenario parameters;

b) the information pertaining to the differences between said reimbursement parameters and said projected user costs according to the user entered scenario parameters;

wherein the information pertaining to the differences between said reimbursement parameters and said projected user costs is expressed as the value(s), symbol(s) or graphic image(s) produced by a mathematical function of said projected reimbursement parameters and said projected user costs;

wherein said client device displays said comparison results ranked or sorted according to one or more ranking or sorting criteria selected from the group consisting of insurance premium amount, adequacy of said reimbursement, location of the organization that offers said insurance plan, or rating of the organization that offers said insurance plan;

thereby allowing said user to enter in alternative scenario parameters, and receive information pertaining to both the premiums of a plurality of different insurance plans, and the adequacy of said reimbursement of said plurality of different insurance plans according to the projected user costs determined from various user entered scenarios.

11. The method of claim 10, wherein said insurance coverage time parameters comprise an insurance start time and an insurance time duration; an insurance start time and an insurance stop time; and/or an option to renew said insurance coverage.

12. The method of claim 10, wherein determining said projected user costs and/or determining said mathematical function is either done at said server, or locally at said device.

13. The method of claim 10, wherein the information pertaining to the differences between said reimbursement parameters and said projected user costs is expressed as a user savings value relative to the projected user costs absent reimbursement.

14. The method of claim 10, in which said method uses an internet server and web browser or other internet enabled client software running on a client device (client).

15. The method of claim 10, wherein said projected user costs comprise a plurality of parameters, at least some of said parameters being parameters selected from the group consisting of costs to replace lost user items, costs to repair damaged user items, costs to repair replace items belonging to others, costs to compensate for lost user income, costs to compensate others for lost income, medical expenses, dental expenses, health related expenses, medical services, and health related services.

16. The method of claim 10, in which said scenario parameters may be rearranged by a user using said at least one user input form into alternate orders of events, so that the same scenario parameters may be evaluated according to alternate orders of scenario events.

17. A method of making insurance comparisons between a plurality of different insurance plans, over a network, said method comprising:

entering information on a plurality of premium parameters and reimbursement parameters of a plurality of different insurance plans into a computer database;

wherein said premium parameters vary as a function of one or more risk parameters;

entering information on the projected user costs associated with various scenarios of possible alternative future events into a computer database;

constructing at least one user input form capable of capturing a plurality of risk parameters, scenario parameters, and insurance coverage time parameters and transmitting said user input form to at least one client device;

wherein said insurance coverage time parameters comprise an insurance start time and an insurance time duration; an insurance start time and an insurance stop time; and/or an option to renew said insurance coverage;

using said at least one user input form to capture said plurality of risk parameters, scenario parameters, and insurance coverage time parameters on said client device;

wherein said scenario parameters are selected to allow said user to enter or select at least one possible alternative future event into said input form;

transmitting said plurality of risk parameters, scenario parameters, and insurance coverage time parameters to an internet server;

using at least one algorithm to use said risk parameters and insurance coverage time parameters to retrieve said premium parameters and reimbursement parameters of a plurality of different insurance plans from said computer database, and producing a comparison result of the premiums of, and reimbursement benefits provided by, said plurality of different insurance plans;

transmitting said comparison results to said at least one client device, and displaying said comparison results along with at least one of:

a) said projected user costs according to the user entered scenario parameters;

b) the information pertaining to the differences between said reimbursement parameters and said projected user costs according to the user entered scenario parameters;

wherein said projected user costs comprise a plurality of parameters, at least some of said parameters being parameters selected from the group consisting of costs to replace lost user items, costs to repair damaged user items, costs to repair replace items belonging to others, costs to compensate for lost user income, costs to compensate others for lost income, medical expenses, dental expenses, health related expenses, medical services, and health related services;

wherein the information pertaining to the differences between said reimbursement parameters and said projected user costs is expressed as the value(s), symbol(s) or graphic image(s) produced by a mathematical function of said projected reimbursement parameters and said projected user costs;

wherein said client device displays said comparison results ranked or sorted according to one or more ranking or sorting criteria selected from the group consisting of insurance premium amount, adequacy of said reimbursement, location of the organization that offers said insurance plan, or rating of the organization that offers said insurance plan;

thereby allowing said user to enter in alternative scenario parameters, and receive information pertaining to both the premiums of a plurality of different insurance plans, and the adequacy of said reimbursement of said plurality of different insurance plans according to the projected user costs determined from various user entered scenarios.

18. The method of claim 17, wherein determining said projected user costs and/or determining said mathematical function is either done at said server, or locally at said device.

19. The method of claim 17, wherein the information pertaining to the differences between said reimbursement parameters and said projected user costs is expressed as a user savings value relative to the projected user costs absent reimbursement.

* * * * *